Figure 1:
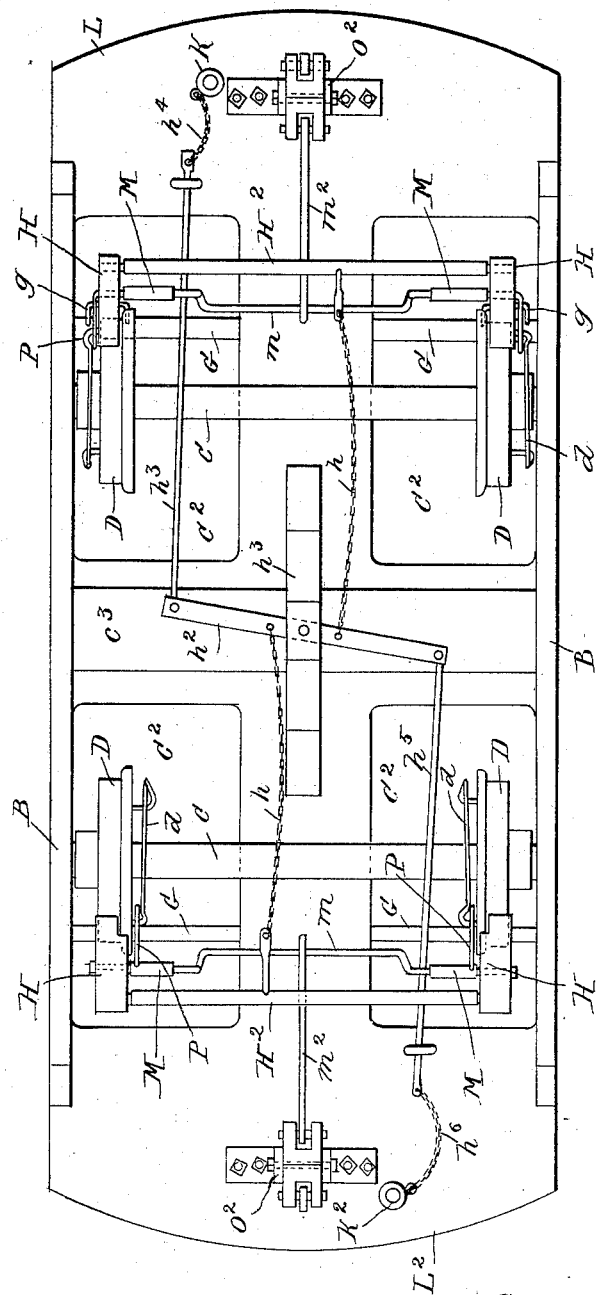

(No Model.)　　　　　　　　　　　　　　　　2 Sheets—Sheet 1.
O. H. RIETHS.
EMERGENCY CAR BRAKE.

No. 565,693.　　　　　　　　　Patented Aug. 11, 1896.

WITNESSES:　　　　　　　　　　　　　INVENTOR
　　　　　　　　　　　　　　　　　　　Otto H. Rieths
　　　　　　　　　　　　　　　BY
　　　　　　　　　　　　　　　　ATTORNEYS.

(No Model.) 2 Sheets—Sheet 2.
O. H. RIETHS.
EMERGENCY CAR BRAKE.
No. 565,693. Patented Aug. 11, 1896.
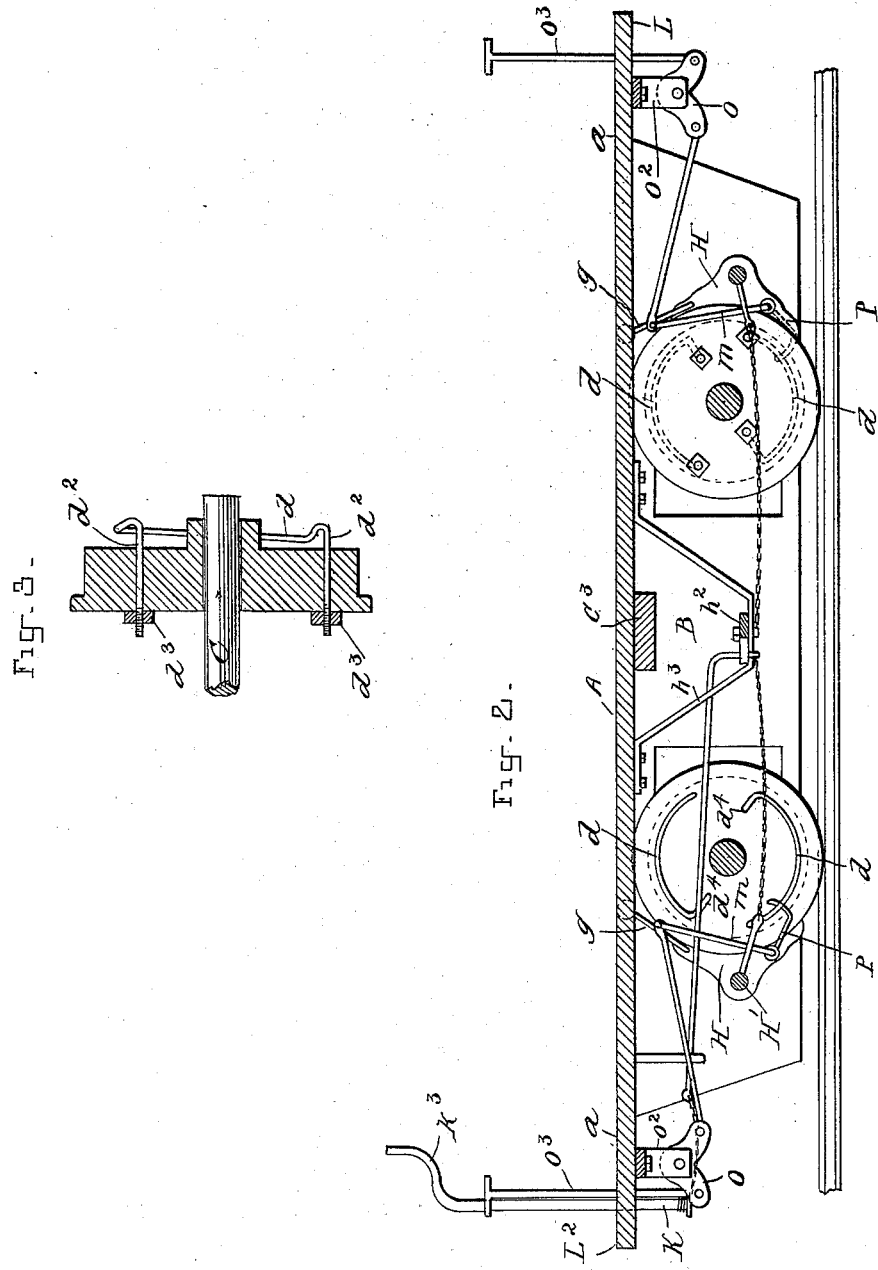
WITNESSES:
INVENTOR
ATTORNEYS.

UNITED STATES PATENT OFFICE.

OTTO H. RIETHS, OF BROOKLYN, NEW YORK.

EMERGENCY CAR-BRAKE.

SPECIFICATION forming part of Letters Patent No. 565,693, dated August 11, 1896.

Application filed February 5, 1896. Serial No. 578,073. (No model.)

*To all whom it may concern:*

Be it known that I, OTTO H. RIETHS, a citizen of the United States, and a resident of Brooklyn, in the county of Kings and State of New York, have invented certain new and useful Improvements in Emergency Car-Brakes, of which the following is a specification, reference being had to the accompanying drawings, forming a part thereof, in which similar letters of reference indicate corresponding parts.

This invention relates to car-brakes, and the object thereof is to provide an effective device of this class which is particularly adapted for use in connection with tramway-cars, a further object being to provide a brake for tramway-cars which, in addition to acting as a brake in the usual manner, is provided with means whereby the wheels may be positively locked; and with these and other objects in view the invention consists of the construction, combination, and arrangement of parts hereinafter described and claimed.

The invention is fully disclosed in the following specification, of which the accompanying drawings form a part, in which—

Figure 1 is a bottom plan view of a car provided with my improved brake; Fig. 2, a longitudinal section thereof at one side of the longitudinal center; and Fig. 3, a transverse section of a car-wheel, showing one of the lock-bars which I employ.

In the drawings forming part of this application I provide a frame comprising a platform or frame A, which projects at each end to form end platforms $a$, and at each side thereof are longitudinal hangers or frames B, in which are mounted the usual axles C, and the platform or frame A is provided near each end and on each side with oblong openings $C^2$, and the central portion is provided with a cross plate or brace $C^3$.

The platform or frame A may constitute the bottom of the car if desired, or the bottom of the car may be placed thereon, and mounted at each end of the axles C are the usual wheels D. These wheels D are provided either on the outer or the inner sides thereof, the location being immaterial, with segmental lock-bars $d$, and it will be observed that two of these lock-bars are employed in connection with each wheel, and the body portion thereof is set out from the wheel, as clearly shown in Figs. 1 and 3, and said lock-bars are connected with the wheels by means of arms $d^2$, which are bent at an angle thereto and passed through the wheel and held in place by nuts $d^3$, as clearly shown in Fig. 3.

Arranged transversely of each of the openings $C^2$ and adjacent to the ends of the platform or frame A are shafts G, one of said shafts being employed in connection with each wheel, and suspended therefrom by means of yokes $g$ are brake-shoes H, one of which is employed in connection with each wheel, and the corresponding brake-shoes H are united by a transverse rod $H^2$, and secured centrally of each of the rods $H^2$ is a chain or other device $h$, each of which is connected with a lever $h^2$, which is supported centrally of the platform A by a hanger $h^3$, as shown in Figs. 1 and 2, and pivotally connected with one end of the lever $h^2$ is a rod $h'$, which extends in the direction of the end L of the car, and connected with the outer end of said rod is a chain or other device $h^4$, which is connected with the lower end of a shaft K, which extends upwardly through the platform and on which the chain is adapted to be wound, and connected with the other end of the lever $h^2$ is a similar rod $h^5$, which extends in the direction of the end $L^2$ of the car, and with the outer end of which is connected a chain $h^6$, which is also connected with the lower end of the shaft $K^2$, which extends upwardly through the platform, and is provided with a crank $K^3$.

It will be understood that one of the shafts K is provided at each end of the car, and is turned to operate the brakes, as will be readily understood, all that is necessary to apply the brakes to each of the wheels being to operate either of said shafts from either end of the car in the usual manner.

The brake-shoes H are of the form shown in Fig. 2, the shaft $H^2$ being passed through the central portion thereof, and said brake-shoes being projected upwardly and downwardly from said shaft and being suspended by the yokes $g$, which are pivotally connected with the upper ends thereof, and I also secure to each brake-shoe in any desired manner inwardly-directed tubular heads or other attaching devices M, which are connected therewith below the connection of the transverse rods H². The tubular heads or attaching devices M are united by means of a yoke m, with the central portion of each of which is pivotally connected a rod m², each of which is connected at its adjacent end of the car with a crank-lever O, which is suspended in a hanger O², and with which is also connected a rod O³, which extends upwardly through the platform, and secured to each of the inwardly-directed heads or attaching devices M is a hook or other locking device P, which is adapted to operate in connection with the segmental lock-bars d or with the arms d² thereof, by which they are secured to the wheels so as to positively lock said wheels and prevent the revolution thereof, and in practise one of the segmental lock-bars d is curved or bent inwardly, closer to the side of the wheel than the other, as shown in Fig. 3, and by means of this arrangement the locking-hooks P, which are adapted to pass between said lock-bars and the sides of the wheels, operate in connection with the brake-shoes to retard the revolution of the wheels before finally locking the same. It will be observed that one of the arms d², by which the lock-bars d are connected with the wheels, is bent inwardly, as shown at d⁴ in Fig. 2, before it passes through the wheel, the object of this arrangement being to provide means whereby the hooks P may pass between the curved or segmental portion of said lock-bars and the side of the wheel, and it will also be observed that the inwardly-directed tubular heads or other attaching devices M are pivotally connected with the brake-shoes, and the operation of this element of the construction will also be readily understood from the foregoing description, when taken in connection with the accompanying drawings and the following statement thereof.

It will be understood that the brakes must first be applied as hereinafter described before the locks can be applied, and this having been done, if it is desired to absolutely lock the wheels, the rods O³, or one of them, are operated by being pulled upwardly, and in this operation the yoke m, with which said rod is connected, is drawn toward the end of the car, and the hooks P, connected therewith, are thrown into connection with the segmental lock-bars d, or between the same and the side of the wheels, and as the wheels turn said hooks come in contact with one of the arms d², by which said segmental lock-bars are connected therewith, this position being shown at the left of Fig. 2 and also in Fig. 1, and thus the wheels are securely locked. It will also be understood that all the brakes may be applied to all of the wheels from either end of the car, but in applying the positive locks only two of the wheels are operated upon at a time unless the rods O³ are operated from each end at the same time. It will thus be seen that I provide a combined brake and lock, and one which is simple in construction and operation, and which is well adapted to accomplish the result for which it is intended, and in which the brake may be operated independently of the lock when desired.

My invention is not limited to the exact form, construction, and arrangement of the various parts thereof as described, and I reserve the right to make all such alterations therein and modifications thereof as fairly come within the scope of the invention.

Having fully described my invention, I claim as new and desire to secure by Letters Patent—

1. In a car-brake, the combination with the wheels of a car, at each end thereof, of a brake-shoe for each wheel, said brake-shoes being pivotally suspended and being united in pairs by a cross-rod, said cross-rods being connected with a lever which is pivotally supported between the axles, each end of which is provided with a rod which is pivotally connected therewith, and which rods extend in opposite directions, to opposite ends of the car, and each of said rods being connected with a shaft which extends upwardly through the platform, by means of a chain, and said brake-shoes and said wheels being also provided with devices whereby they may be positively locked when the brake-shoes are in operative position, substantially as shown and described.

2. In a car-brake, the combination with the wheels of a car, at each end thereof, of a brake-shoe for each wheel, said brake-shoes being pivotally suspended and being united in pairs by a cross-rod, said cross-rods being connected with a lever which is pivotally supported between the axles, each end of which is provided with a rod which is pivotally connected therewith, and which rods extend in opposite directions, to opposite ends of the car, and each of said rods being connected with a shaft which extends upwardly through the platform, by means of a chain, and said brake-shoes and said wheels being also provided with devices whereby they may be positively locked when the brake-shoes are in operative position, said devices consisting of a yoke which extends transversely across the car and the ends of which are connected with the brake-shoes of each pair, each of said yokes being provided at the end thereof, adjacent to each shoe with a hook which is adapted to operate in connection with the segmental locking-bars, secured to the wheels, and each of said yokes being also provided centrally with a rod which is pivotally connected therewith, said rods being extended in opposite directions to opposite ends of the car, and being connected with one arm of a crank-lever suspended beneath the car, the other arm of which is pivotally connected with the operative rod, which extends upwardly through the platform, substantially as shown and described.

3. The combination with a car-brake of a positive lock consisting of a segmental lock-bar rigidly secured to the car-wheel and extending across a side thereof, a rod-operated crank-lever arranged at an end of the car, and intermediate connecting devices embracing a hook adapted to engage in said lock-bar, all constructed and arranged substantially as herein shown and described.

In testimony that I claim the foregoing as my invention I have signed my name, in presence of the subscribing witnesses, this 1st day of February, 1896.

OTTO H. RIETHS.

Witnesses:
C. GERST,
L. M. MULLER.